Patented May 27, 1941

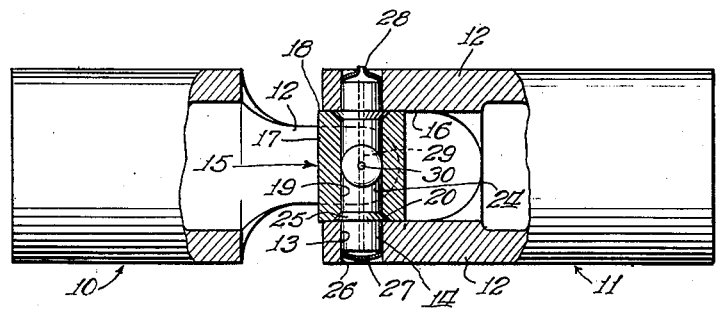
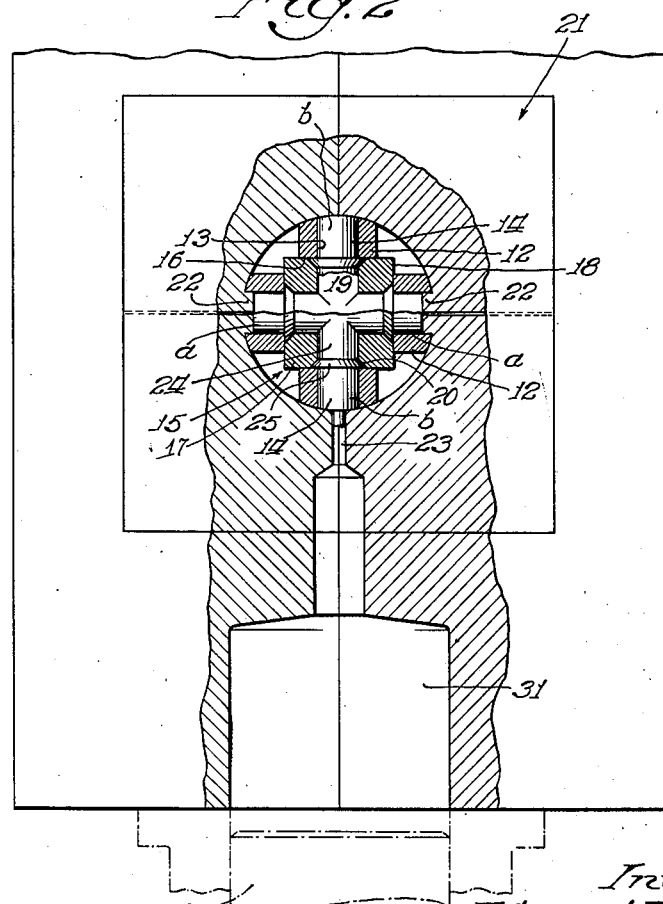

2,243,062

UNITED STATES PATENT OFFICE 2,243,062

INDUSTRIAL JOINT

Edmund B. Anderson, Rockford, Ill., assignor to Borg-Warner Corporation, Chicago, Ill., a corporation of Illinois Application July 19, 1939, Serial No. 285,278

5 Claims. (Cl. 22—203)

This invention relates to the making of universal joints and has as its object to provide a novel universal joint comprising a pair of one-piece yokes and a spider having integral trunnions journalled in the yokes, the trunnions being in the form of an integral one-piece cross cast into a block to form the central region of the spider.

Another object of the invention is to provide a method of forming a universal joint as described above, wherein the one-piece yokes and the trunnion block are assembled together in proper relationship and associated with a suitable mold housing in order to form the mold for the trunnion portion of the spider, the latter being formed by pouring molten metal into the bearing opening of one of the yoke arms and allowing said metal to fill a cross-shaped cavity in the trunnion spider block and to fill the trunnion openings, the trunnions being formed by the solidifying of the metal in the trunnion openings.

Another object of the invention is to provide a method by which the trunnions may have working clearance in the trunnion openings, and to this end, the yokes are allowed to remain at a sufficiently low temperature (such as room temperature) so as to chill the metal in the trunnion openings and to cause it to shrink away from the surfaces thereof to produce clearance.

Another object of the invention is to provide a method of forming a joint of the type described above, whereby the shrinkage of the metal away from the trunnion spider block will not loosen the trunnion spider therein. To this end the method contemplates the flaring of the outer ends of the cavity in the trunnion block so as to form frusto-conical shoulders on the trunnions adapted, when the core portion of the trunnion spider shrinks upon cooling, to wedge tightly against the frusto-conical faces of the trunnion spider block, so as to both tighten and center the spider core in the spider block.

Another object of the invention is to provide a universal joint having the features described in the last paragraph.

Another object of the invention is to provide a universal joint of the type described above, having provision for lubrication of the trunnions in the trunnion bearings.

To this end, the trunnions are made shorter than the trunnion bearings, so as to leave spaces in the outer extremities of the bearings into which are forced disc-like caps which close the outer ends of the bearing openings and prevent the escape of lubricant, forcing the lubricant to work its way between the trunnions and the bearing surfaces. Lubricant is distributed to the spaces between the ends of the trunnion openings and the aforesaid caps, by lubricant bores extending axially through the trunnions and the trunnion core. In one of the trunnion openings, instead of a cap, there may be mounted a nipple through which lubricant may be introduced to one of the bores, from which bore it may find its way to the other bore and then to the ends of all of the trunnions.

Other objects, the advantages and uses of the invention will become apparent after reading the following specification and claims, and after consideration of the drawing forming a part of the specification, wherein:

Figure 1 is a view partly in axial section and partly in elevation, of a universal joint embodying the invention; and Figure 2 is a transverse sectional view through the joint and a mold box which may be employed in making the joint.

As an illustration of one form in which the invention may be embodied I have shown in Figures 1 and 2 a universal joint comprising a pair of yokes 10 and 11 each formed with a pair of integral spaced arms 12 in the end regions of which are aligned cylindrical openings 13 forming bearings for the trunnions 14 of a trunnion spider 15.

The trunnions 14 are formed integrally, and in order to make it possible to assemble the joints, they are cast into the bearing openings 13 while the yokes 10 and 11 are associated with each other in properly assembled relation.

This is made possible by forming the interior faces 16 of the yoke arms 12 flat and parallel to each other and by providing a spider block 17 having end faces 18 which are flat and arranged in pairs of opposite parallel faces snugly receivable between the flat faces 16 of the arms 12, so as to provide sealed communication between the bearing openings 13 and the ends of a cross-shaped cavity 19 in the bearing block 17.

The bearing openings 13 and cavity 19 may be formed by drilling. The ends of the openings 19 are flared outwardly as at 20 for a purpose which will later appear.

Preparatory to pouring the trunnion spider, the yokes are assembled with the spider block 17 in a suitable casting die, indicated generally at 21 in Figure 2, each half of which has a boss or plug 22 adapted to fit snugly within a corresponding bearing opening 13 and to project therein to define the ends of two of the trunnions 14. Communicating with the lower bearing opening 13 is a charging inlet 23 adapted to receive molten metal forced upwardly from a well 31 by means of a plunger 32 of a conventional die casting apparatus.

Molten metal (such as bearing bronze) thus injected into the die 21, fills the cavity 19 and the bearing openings 13 up to the ends of the plugs 22, thereby forming within the bearing openings 13, two trunnions, indicated in Fig. 2 at a, which terminate short of the ends of the openings a distance corresponding to the length of the plugs 22. The other two trunnions indicated at b, may be shortened to the proper length by drilling, after the joint has been removed from the die.

As the molten metal cools, it will solidify to form the four trunnions 14 connected by a central cross-shaped core 24, a frusto-conical shoulder 25 being formed between each trunnion and the corresponding arm of the core. The shoulders 25 of opposite pairs will draw toward each other as the metal cools, and will thereby wedge tightly against the frusto-conical surfaces 20 of the spider block so as to compensate for the shrinking of the core away from the cavity 19 and center and tightly wedge the core in the spider block.

The shrinkage of the metal of the trunnion 14 will provide working clearance between the trunnions and the bearing openings 13.

The proper shrinkage may be obtained simply by leaving the yokes and spider block at normal room temperatures prior to the pouring.

After the core has cooled, the joint is removed from the die. It is then drilled to shorten the trunnions b and to produce the bores 29 and 30 extending through the respective arms of the cross member 24 and trunnion 14. The bores 29 and 30 communicate at the center of the cross member 24.

Into three of the cavities 26 defined between the ends of the trunnions and the ends of the bearing openings 13, are inserted cupped discs 27 of such a diameter as to remain tightly wedged in place after having been inserted under pressure.

In the fourth bearing opening is inserted a fitting 28 through which lubricant may be injected into the bore 29 from which it may find its way to the ends of all of the trunnions 14.

By reason of the cup formation of the caps 27, domed chambers will be formed between the caps and the ends of the trunnions, in which the lubricant may spread radially outwardly to the cylindrical bearing surfaces of the trunnions. Thence it may work its way between the trunnions and the bearing surfaces 13 back to the shoulders 20, and then outwardly between the yoke arm faces 16 and the block faces 18. The lubricant tends to remain, however, in the bearing chambers during operation, due to centrifugal force tending to force said lubricant radially outwardly.

The invention is particularly useful in the making of small universal joints of the type commonly known as "industrial" joints, being extremely inexpensive and yet furnishing a very saisfactorily operating joint.

I claim:

1. A method of making a universal joint comprising providing a pair of one-piece yokes each including a pair of spaced arms having aligned cylindrical trunnion openings and flat parallel inner faces, fitting said yokes over a trunnion block having flat faces snugly received between the arms of the respective yokes and having a cross-shaped cavity the arms of which register with the respective trunnion openings, closing three of said openings and injecting into the fourth opening, molten metal adapted to fill said cross-shaped cavity and said trunnion openings so as to form trunnions in each of said openings connected by a cross-shaped core.

2. The method defined in claim 1, wherein the yokes, prior to injecting, are relatively cool so as to chill the metal in the trunnion openings and cause the same to shrink for providing clearance between the trunnions and the openings.

3. The steps in the method of making a universal joint, including the following: providing a pair of one-piece yokes each having a pair of spaced arms provided with aligned cylindrical openings and flat parallel inner faces, fitting said yokes over a trunnion block having flat faces adapted to be snugly received between the faces of the yoke arms and having a cross-shaped cavity the extremities of which are adapted to register with the trunnion openings and are flared outwardly, closing three of the trunnion openings, and injecting into the fourth opeing a molten metal adapted to fill the trunnion openings and said cavity, to form in said outwardly flared end regions of the cavity a series of shoulders, and to form beyond said shoulders, trunnions received in the trunnion openings, and regulating the temperature of the trunnion block so that the block will chill the trunnion material and cause the same to shrink and draw said shoulders tightly against the flared regions of the cavity.

4. The steps in the method of making a universal joint, including the following: providing a pair of one-piece yokes each having a pair of spaced arms provided with machined cylindrical trunnion openings, assembling said yokes in embracing relationship with a trunnion block having sides conforming to and arranged to be snugly received between the inner faces of the trunnion arms or of the yoke arms, and having a cross-shaped cavity the external extremities of which are adapted to register with said trunnion openings, and injecting molten material into said openings and cavities so as to fill the same and provide a cross-shaped core cast into said trunnion block and trunnions projecting from said core into said trunnion openings.

5. A method of constructing a universal joint, which includes the following steps: providing a pair of one-piece yokes of steel material, each having a pair of spaced arms provided with cylindrical trunnion openings and flat parallel inner faces, assembling said yokes over a steel trunnion block having flat parallel exterior faces arranged to be snugly received between the faces of said yokes, and having a cross-shaped cavity the external extremities of which are adapted to register with said trunnion openings, arranging the parts in such registry, and injecting molten metal into said trunnion openings and said cavity so as to form a cross-shaped core within the trunnion block, the arms of which terminate in trunnions projecting into said trunnion openings, said molten metal having a low coefficient of friction with respect to steel.

EDMUND B. ANDERSON.